United States Patent [19]

Bjelland et al.

[11] Patent Number: 5,210,718
[45] Date of Patent: May 11, 1993

[54] CALIBRATION OF SEISMIC STREAMERS IN A HELMHOLZ RESONATOR

[75] Inventors: Cato Bjelland, Indalsto; Jan-Age Langeland, Garnes, both of Norway

[73] Assignee: Geco A.S., Stavanger, Norway

[21] Appl. No.: 882,548

[22] Filed: May 13, 1992

[30] Foreign Application Priority Data

May 31, 1991 [NO] Norway .................. 912112

[51] Int. Cl.$^5$ .................. H04B 17/00; H04R 29/00
[52] U.S. Cl. .................. 367/13; 73/1 DV
[58] Field of Search .................. 367/13; 73/1 DV

[56] References Cited

U.S. PATENT DOCUMENTS

| | | | |
|---|---|---|---|
| 3,859,620 | 1/1975 | Percy | 367/13 |
| 4,196,790 | 4/1980 | Reams | 181/145 |
| 4,205,394 | 5/1980 | Pickens | 367/13 |
| 4,290,123 | 9/1981 | Pickens | 367/13 |
| 4,320,468 | 3/1982 | Montross | 367/13 |
| 4,375,679 | 3/1983 | Park, Jr. et al. | 367/13 |
| 4,441,173 | 4/1984 | McEachern | 367/13 |
| 4,563,756 | 1/1986 | Assard | 367/13 |
| 4,648,078 | 3/1987 | Darton et al. | 367/13 |
| 5,119,427 | 6/1992 | Hersh et al. | 381/71 |

FOREIGN PATENT DOCUMENTS 0203227  5/1985  European Pat. Off. .
277575  11/1988  Fed. Rep. of Germany .

Primary Examiner—Ian J. Lobo
Attorney, Agent, or Firm—Jacobson, Price, Holman & Stern

[57] ABSTRACT

A method for calibration of hydrophone groups is based on the use of a Helmholtz resonator, which is arranged such that a seismic streamer (11) or sections thereof can be placed in the resonator's cavity (1) and connected via a hydrophone group selector (9) to a signal analyzer (6). A sound source (3) provided in the Helmholtz resonator is driven by a white noise signal at a frequency close to the resonator's resonance frequency. The sensitivity of the hydrophones in the respective hydrophone group (10) which is to be calibrated is determined by passing the hydrophone signals to the signal analyzer (6) where they are compared with a reference signal from a reference transducer (5), e.g., a measuring microphone, provided in the resonator. The Helmholtz resonator is designed as a drum-shaped vessel (1) provided with a funnel-shaped neck which constitutes an acoustic horn (2) and creates an impedance matching between the vessel (1), which constitutes a resonant cavity, and an electrodynamic transducer, which constitutes the sound source (3), provided at the smaller end of the horn (2). For the measurements a measuring microphone (5) is provided inside the cavity together with, e.g., a reel (4) or drum on which are wound sections of a seismic streamer, or a seismic streamer (11), whose hydrophone groups (10) are to be calibrated.

15 Claims, 1 Drawing Sheet

CALIBRATION OF SEISMIC STREAMERS IN A HELMHOLZ RESONATOR

BACKGROUND OF THE INVENTION

The invention concerns a method for calibration of hydrophone groups, especially hydrophone groups in seismic streamers or sections of seismic streamers. The invention also concerns a calibration system for hydrophone groups, especially hydrophone groups in seismic streamers or sections of seismic streamers, wherein the calibration system comprises a signal analyzer connected respectively with a voltage source for a measuring microphone, a hydrophone group selector and a power amplifier for driving a sound source connected to the signal generator of the signal analyzer.

There is a well-known technique of calibrating the hydrophones in a seismic streamer individually by means of a hydrostatic pressure pulse in a fluid-filled chamber or similar arrangement. Such calibration systems are known from, among others, U.S. Pat. No. 4,320,468 (Montross), U.S. Pat. No. 4,375,679 (Park et al.) and U.S. Pat. No. 4,441,173 (McEachern). Alternatively, as shown in U.S. Pat. No. 4,563,756 (Assard), an acoustic signal simulator can be used. A method is also previously known of calibrating individual hydrophones by supplying them with electrical signals and measuring output voltages or currents. Such calibration systems are described, among others, in European application No. EP 203 227A1 (Quellhorst) or U.S. Pat. No. 4,648,078 (Darton et al.). Finally from U.S. Pat. No. 4,290,123 a method is known for calibrating the hydrophones in a hydrophone group by towing sections of a seismic streamer in the water past a small acoustic projector for acoustic test signals.

The present applicant has moreover for calibrating individual hydrophones, used a calibration system called "Distofon" which is based on the use of a hydrophone calibrator of type 4223 from Bruel & Kj r. With this system an accuracy of 0.5 dB has been achieved in calibrating the hydrophones. It permits calibration of hydrophones in the frequency range 30 to 300 Hz.

The present applicant has also developed a system for calibrating entire sections or hydrophone groups, called "KAVAC". This system is based on a description of G. Pickens and comprises six woofer loudspeakers mounted in the cover of a chamber with a volume of approximately 2.5 cubic meters. The calibration of hydrophone groups is performed in the "KAVAC" system at approximately 15 Hz, but it is encumbered with a variety of disadvantages, such as resonance in the chamber walls and insufficient sealing, which results in a dipole effect at low frequencies. This means that it is not possible to achieve a uniform sound field. Since the "KAVAC" system is also large and unwieldy, there is a much greater chance of obtaining incorrect measurements.

As far as the other above-mentioned calibration systems are concerned, none of these offers a rational solution to the problem of calibrating hydrophones in seismic streamers. They are mainly intended for calibration of hydrophones individually, a procedure which not only makes calibration time consuming and expensive, but also makes it difficult to attain consistent measuring conditions, thereby leading to inaccurate calibration.

BRIEF SUMMARY OF THE INVENTION

The object of the present invention, therefore, is to provide a calibration system which permits accurate calibration of hydrophone groups in entire sections of seismic streamers or entire seismic streamers under exactly similar conditions while at the same time being both fast and inexpensive. Another object of the method in accordance with the present invention is to ensure that the calibration is performed in an even and uniform sound field. A further object of the present invention is to provide a calibration system to perform the method so as to achieve the above-mentioned and other objects The above-mentioned objects are achieved in accordance with the invention by a calibration system for calibrating hydrophone groups in seismic streamers and sections of seismic streamers including a Helmholtz resonator in the form of a drum-shaped vessel having a resonant cavity in the vessel, an opening in the vessel communicating with the cavity, a reference acoustic transducer in the cavity, a voltage source connected to the reference acoustic transducer, an electrodynamic transducer loudspeaker in the opening, a power amplifier connected to the loudspeaker for driving the loudspeaker, a hydrophone group selector connectable to the hydrophone groups to be calibrated, a signal analyzer connected to the hydrophone group selector and voltage source and having a signal generator connected to the power amplifier, a funnel-shaped neck comprising an acoustic horn having a larger end communicating with the cavity and a smaller end connected to the loudspeaker for providing impedance matching between the resonant cavity and the loudspeaker.

In the method, the hydrophone groups are placed in the cavity and connected to the hydrophone selector, the loudspeaker is driven with a white noise signal of a frequency close to the resonance frequency of the resonator to produce an isotropic acoustic pressure field in the cavity, operating the selector to select the hydrophones to be calibrated, and determining the sensitivity of individual hydrophones to be calibrated by comparing signals from selected hydrophones with the reference signal from the reference transducer, produced by the acoustic pressure field, in the signal analyzer.

BRIEF DESCRIPTION OF THE DRAWINGS

The invention will now be explained in greater detail in the following description of the calibration system as it is implemented and used in the embodiment of the method in accordance with the invention, taken in conjunction with the accompanying drawings, wherein.

DETAILED DESCRIPTION

Figure 1:
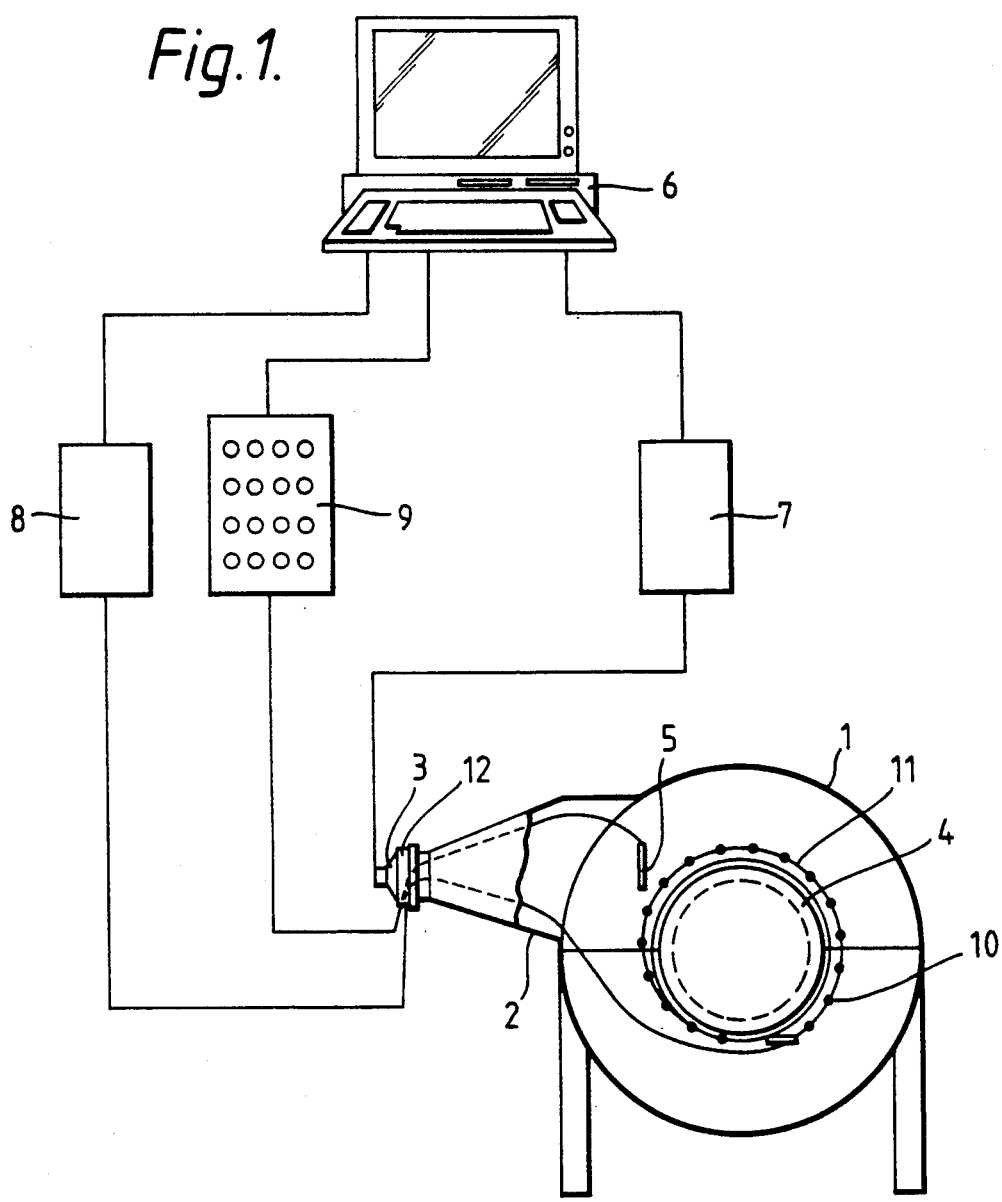
FIG. 1 is a schematic representation of the calibration system in accordance with the invention.
Figure 2:
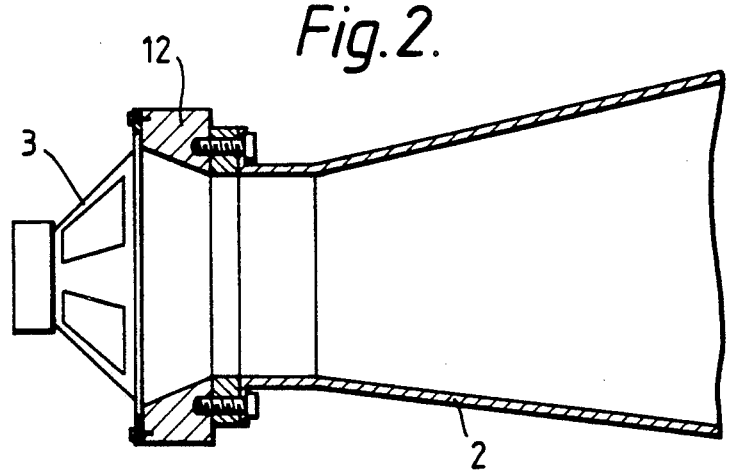
FIG. 2 is a schematic cross-sectional view showing the arrangement of a loudspeaker in the calibration system in accordance with the invention.

In the method according to the present invention a calibration system is used which is based on a Helmholtz resonator. A Helmholtz resonator is a cavity with an opening When a sound source provided at the opening of the cavity is driven at a frequency close to the resonance frequency of the cavity, a uniform sound pressure field is obtained in the cavity. It should be noted that the Helmholtz resonator should be regarded as an individually driven oscillator, i.e. that the resonance in the cavity is not due to standing waves between the walls of the cavity.

The Helmholtz resonator in the calibration system according to the present invention is designed as a vessel with a neck in the form of an acoustic horn. At the end of the acoustic horn is mounted a sound source in the form of a small woofer. The use of an acoustic horn increases the effect at low frequencies. Moreover, the acoustic horn provides impedance matching between the impedance of the medium (air) in the resonator and the loudspeaker's impedance. At the resonance frequency the air in the acoustic horn moves in phase with the sound source and no wave propagation occurs. The air in the horn moves as a mass element and the resonance is the same as in a single harmonic oscillator. The Helmholtz resonator's vessel, i.e. the cavity, is designed large enough to contain sections of a seismic streamer or an entire seismic streamer in a special arrangement in the vessel, e.g. a cable reel. All the hydrophones which are then placed inside the vessel will be exposed to the same sound pressure level about the Helmholtz resonator's resonance frequency. The sensitivity of the various hydrophones in the group can then be determined by comparing the output signals with a known reference measurement device which is provided inside the container.

In one embodiment of the calibration system according to the invention, an acoustic horn is used with a critical frequency of 124 Hz. The phase velocity of the waves in the fluid which constitutes the acoustic medium in the horn is a function of the wave frequency and becomes infinite when the frequency is lower than the critical frequency. When the phase velocity becomes infinite, this means that all parts of the fluid in the medium are moving in phase. Consequently no propagation of the acoustic waves takes place when the resonance frequency is lower than the critical frequency. A reasonable assumption can thus be made that the air in the horn moves in phase with the sound source if the resonance frequency of the Helmholtz resonator is lower than the stated critical frequency. It should be noted that the resonance frequency is not dependent on the shape of the resonator. Higher resonances can also occur due to standing waves in the cavity space Since the Helmholtz resonance is due to an oscillation of the fluid in the acoustic horn, this means that the higher resonance frequencies are not harmonically associated with the Helmholtz resonance.

In the above-mentioned embodiment of the calibration system according to the invention, the total mass in motion, i.e. the air in the horn and the loudspeaker cone is 0.067 kg. The loudspeaker cone's rigidity is 768 N/m and the rigidity due to volume compression 7 N/m. This gives a total effective rigidity of 775 N/m. The resonance frequency of the calibration system as a Helmholtz resonator is thereby obtained from the square root of the ratio between the total effective rigidity and the total movable mass, which in the embodiment in the present case gives a resonance frequency of 17 Hz. This is clearly well below the critical frequency of the acoustic horn which was calculated to be 124 Hz. Thus it is safe to say that the air in the acoustic horn moves in phase with the sound source. It should be noted, however, that it may be necessary to use a more sophisticated model of the calibration system in order to calculate the exact resonance frequency.

An embodiment of the calibration system will now be described in more detail with reference to FIG. 1. A so-called "skin"-tank 1 has been shown to provide a suitable cavity. This is a vessel which is really designed to pull the inside of the seismic streamer into the streamer skin. The tank 1 is made of steel and a typical wall thickness is approximately 2 cm. It is dimensioned in order to withstand great pressure and is thus rigid and airtight. The tank is drum-shaped and consists of an upper and a lower half. Inside the tank is located a drum or reel 4 onto which the seismic streamer 11 or streamer sections are wound. In the upper half the tank is connected to a hornshaped neck which constitutes the Helmholtz resonator's acoustic horn 2. At the end of the horn 2 is mounted a loudspeaker 3 which constitutes the sound source. The combined system tank 1, horn 2 and loudspeaker 3 now constitute a Helmholtz resonator. As a reference measurement device a condenser microphone 5 is provided inside the cavity. The microphone 5 can, e.g. be of the type Brül & Kj r 4133 and is connected to a signal analyzer 6 which can, e.g be of the type Bruel & Kj r 2032. The signal generator in the signal analyzer 6 is to the loudspeaker 3 via a power amplifier 7. The microphone 5 is driven from a suitable power supply 8 arranged between the signal analyzer 6 and the microphone 5. Moreover, the signal analyzer 6 is connected to the hydrophone groups 10 via a selector 9 for the hydrophone groups 10.

When the measurements are made the seismic streamer 11 or streamer sections are wound onto the reel 4 or drum inside the vessel and the hydrophone groups 10 are connected to the signal analyzer 6 as indicated. The loudspeaker 3 is driven with a white noise signal or with a signal of a frequency close to the resonator's resonance frequency. In the resonator an isotropic acoustic pressure field is now generated and the sensitivity of the hydrophones in the respective hydrophone group 10 which is to be calibrated can be found by comparing the signals with a known reference inside the vessel 1. The measurements can now be performed at a frequency which is either equal to the Helmholtz resonator's resonance frequency or at a frequency which generates a maximum sound pressure level in the resonator. The amplitudes of the output signals from the hydrophones in the relevant group are measured and compared with the amplitude of the output signal from the reference microphone 5 which has a known sensitivity. The sensitivity of the hydrophones can thus be determined by comparison with the amplitude of the output signal of the reference microphone 5.

It should be noted that the sound pressure in the Helmholtz resonator is dependent on the resonator volume and consequently the sound source, i.e. the loudspeaker 3 and its excitation. Care should be taken, however, to ensure that the sound pressure is sufficient to enable sections of a seismic streamer 11 to be calibrated. A typical value of the sound pressure level is, e.g., 10 microbar rms. The volume of the cavity will naturally be affected by the number of sections or the length of the seismic streamer 11 which is placed in the vessel 1. The more sections the greater the pressure.

It may also be possible to obtain a greater sound pressure level by using sound sources with a greater stroke, e.g. by replacing the loudspeaker 3 with a piston system, for instance a piston driven by a motor. Such a piston system can also be of an electrodynamic nature and several other types of loudspeakers could well be used for the purpose.

Another solution will be to vary the volume of the cavity or the vessel 1 by altering its geometrical dimensions. A practical way of achieving this would be, e.g., to partially fill the vessel or cavity with a liquid such as water during the measuring process. It could also be expedient to adjust the geometry of the horn 2 and it will be obvious to a specialist in the field that this can be done in several ways. The loudspeaker 3 or sound source can, e.g., be attached to the horn 2 with an adjustable flange 12, thereby allowing the length of the horn to be adjusted.

In the method for calibration of hydrophone groups in accordance with the present invention, therefore, by means of a Helmholtz resonator a uniform sound field is achieved which permits accurate calibration of the hydrophone groups 10 in entire sections or an entire seismic streamer 11. In the latter case the vessel 1 must naturally be of sufficiently large dimensions to take the streamer length. It has proved to be advantageous to use as a resonator a vessel 1 in the form of an already existing tank, viz. a so-called "skin"-tank for seismic streamers, which with simple modifications can be implemented as a Helmholtz resonator. The calibration is performed by exciting the sound source, i.e. the loudspeaker 3, at a frequency which is approximately equal to the Helmholtz resonance. This has resulted in the entire system oscillating as a single harmonic oscillator and an approximately isotropic sound pressure field is obtained in the tank, which in other words means that there will only be small variations in the sound pressure level for different positions inside the cavity.

We claim:

1. A method for calibrating hydrophone groups in seismic streamers and sections of seismic streamers comprising:
   providing a Helmholtz resonator comprising a vessel having a cavity therein with a resonance frequency, an opening in said vessel communicating with said cavity, and a sound source at said opening;
   placing said hydrophone groups in said cavity of said vessel;
   connecting said hydrophone groups to a hydrophone group selector;
   connecting said hydrophone group selector to a signal analyzer;
   providing a reference transducer in said cavity of said vessel for producing a reference signal;
   connecting said reference transducer to said signal analyzer;
   driving said sound source with a white noise signal of a frequency close to said resonance frequency of said resonator to produce an isotropic acoustic pressure field in said resonator;
   selecting said hydrophones to be calibrated by said selector; and
   determining the sensitivity of individual hydrophones in respective hydrophone groups selected to be calibrated by comparing signals from said hydrophones with said reference signal from said reference transducer, produced by said acoustic pressure field, in said signal analyzer.

2. A method as claimed in claim 1 wherein a measuring microphone with known sensitivity is used as said reference transducer.

3. A method as claimed in claim 2, wherein:
   said step of determining sensitivity of said hydrophones comprises measuring the frequency range signal from said measuring microphone and said individual hydrophones in respective groups.

4. A method as claimed in claim 3, and further comprising:
   performing said measurements at a frequency signal to said resonance frequency of said resonator.

5. A method as claimed in claim 4, and further comprising:
   varying said resonance frequency of said resonator by altering the geometry of said cavity in said vessel.

6. A method as claimed in claim 5, and further comprising:
   performing said measurements at a frequency which gives a maximum sound pressure level in said resonator.

7. The method as claimed in claim 1, wherein:
   said sound source comprises a loudspeaker having a diaphragm corresponding to said opening in said vessel.

8. The method as claimed in claim 7 and further comprising:
   providing an impedance matching acoustic horn between said cavity and said loudspeaker.

9. The method as claimed in claim 1 and further comprising:
   providing an impedance matching acoustic horn between said cavity and said sound source.

10. In a calibration system for calibrating hydrophone groups in seismic streamers and sections of seismic streamers including a vessel, and a cavity in said vessel for receiving said hydrophone groups, the improvement comprising:
    a Helmholtz resonator comprising a drum-shaped vessel and a resonant cavity in said vessel;
    an opening in said vessel communicating with said cavity;
    a reference acoustic transducer in said cavity;
    a voltage source connected to said reference acoustic transducer;
    a sound source in said opening;
    a power amplifier connected to said sound source for driving said sound source;
    a hydrophone group selector connectable to hydrophone groups to be calibrated;
    a signal analyzer connected respectively to said hydrophone group selector and said voltage source and having a signal generator connected to said power amplifier;
    a funnel-shaped neck comprising an acoustic horn having a larger end communicating with said cavity and a smaller end, said acoustic horn providing impedance matching between said resonant cavity and said sound source; and
    said sound source comprising an electrodynamic transducer loudspeaker connected to said smaller end of said horn.

11. A calibration system as claimed in claim 10 wherein:
    said acoustic horn has adjustable geometry for varying the resonance frequency of said resonator.

12. A calibration system as claimed in claim 11 wherein:
    said resonant cavity of said resonator has an adjustable volume for varying the resonance frequency of said resonator.

13. A calibration system as claimed in claim 12 wherein:
    said cavity of said resonator is adapted to be charged with a liquid for adjusting the volume thereof.

14. A calibration system as claimed in claim 10 wherein:
said resonant cavity of said resonator has an adjustable volume for varying the resonance frequency of said resonator.

15. A calibration system as claimed in claim 14 wherein:
said cavity of said resonator is adapted to be charged with a liquid for adjusting the volume thereof.

* * * * *